(12) United States Patent
Krishnamurthy et al.

(10) Patent No.: US 9,763,182 B1
(45) Date of Patent: Sep. 12, 2017

(54) MOBILE DEVICE MORPHING USING MOBILE NETWORK AVAILABILITY

(71) Applicant: INTERNATIONAL BUSINESS MACHINES CORPORATION, Armonk, NY (US)

(72) Inventors: Rajaram B. Krishnamurthy, Wappingers Falls, NY (US); Daniel Rogers, San Leandro, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/097,486

(22) Filed: Apr. 13, 2016

(51) Int. Cl.
*H04W 52/02* (2009.01)
*H04W 48/18* (2009.01)
*H04W 88/06* (2009.01)

(52) U.S. Cl.
CPC ............ *H04W 48/18* (2013.01); *H04W 88/06* (2013.01)

(58) Field of Classification Search
CPC ..... H04W 48/04; H04W 4/046; H04W 12/06; H04W 4/021; H04W 64/006; H04W 28/0236; H04W 28/02891; H60R 25/241; H04L 63/1433; H04L 43/04; H04L 63/0838
USPC ................... 455/456.1, 435.2; 370/235, 238
See application file for complete search history.

(56) References Cited

U.S. PATENT DOCUMENTS

| | | | |
|---|---|---|---|
| 8,422,991 B2 | 4/2013 | Lazaridis | |
| 2009/0047944 A1* | 2/2009 | Johnson | H04W 24/10 455/424 |
| 2010/0291904 A1 | 11/2010 | Musfeldt et al. | |
| 2011/0070877 A1* | 3/2011 | Macaluso | H04M 1/72525 455/419 |
| 2011/0125838 A1 | 5/2011 | Rao | |
| 2012/0158947 A1 | 6/2012 | Hassan et al. | |

(Continued)

FOREIGN PATENT DOCUMENTS

WO 03034699 A1 4/2003

OTHER PUBLICATIONS

Future of Mobile Devices—Energy Efficient Sensing, Computing, and Communication; Tapani Ryhänen, Nokia Research Center, Eurolabs and the University of Cambridge; 2009 Symposium on VLSI Circuits Digest of Technical Papers; pp. 98-101.

(Continued)

*Primary Examiner* — Phuoc H Doan
(74) *Attorney, Agent, or Firm* — Cantor Colburn LLP; Steven Meyers

(57) ABSTRACT

Apparatus, systems and methods for maintaining connection to a wireless service provider on a mobile device. A mobile computing device having stored data and a morph engine is connected to a wireless service provider selected from a plurality of wireless service providers accessible by the mobile device. Triggering data is received at the mobile computing device, whereby the morph engine thereof compares this triggering data against the stored data to determine an optimal wireless service provider that maintains a wireless signal connection on the mobile device. The optimal wireless service provider is identified from the plurality of other wireless service providers, and the wireless signal connection on the mobile device is switched from the first wireless service provider to the optimal wireless service provider to maintain the wireless signal connection.

17 Claims, 6 Drawing Sheets

(56) References Cited

U.S. PATENT DOCUMENTS

2013/0091450 A1 4/2013 Yi et al.
2014/0313902 A1* 10/2014 Bruner .............. H04W 28/0236
370/238

OTHER PUBLICATIONS

Enabling Technology for Personalizing Mobile Services,; M.M. Lankhorst et al., Telematica Instituut, the Netherlands; 2002 IEEE; Proceedings of the 35th Hawaii International Conference on System Sciences 2002.

* cited by examiner

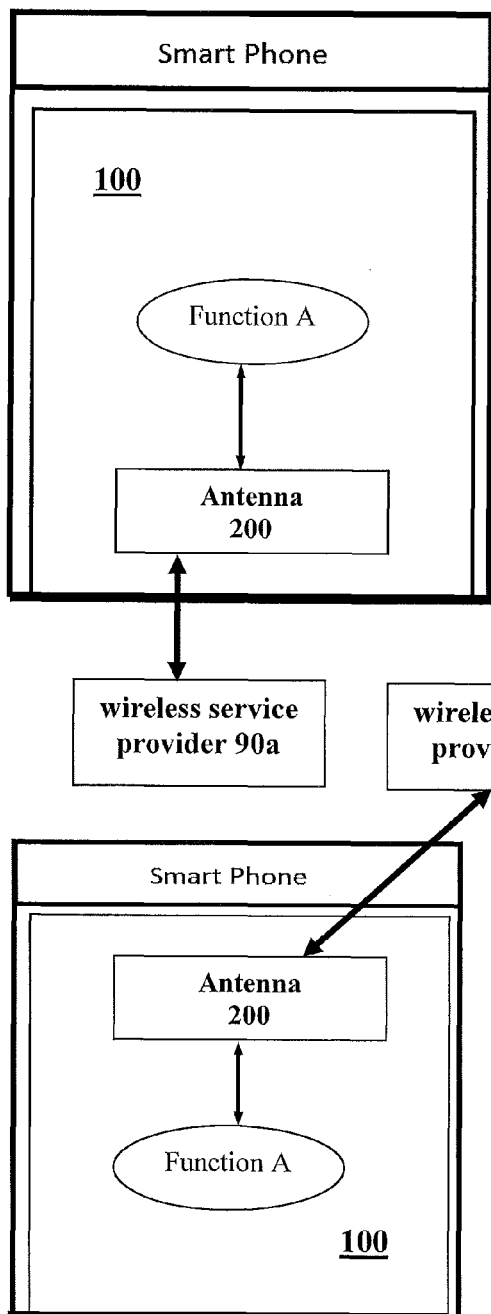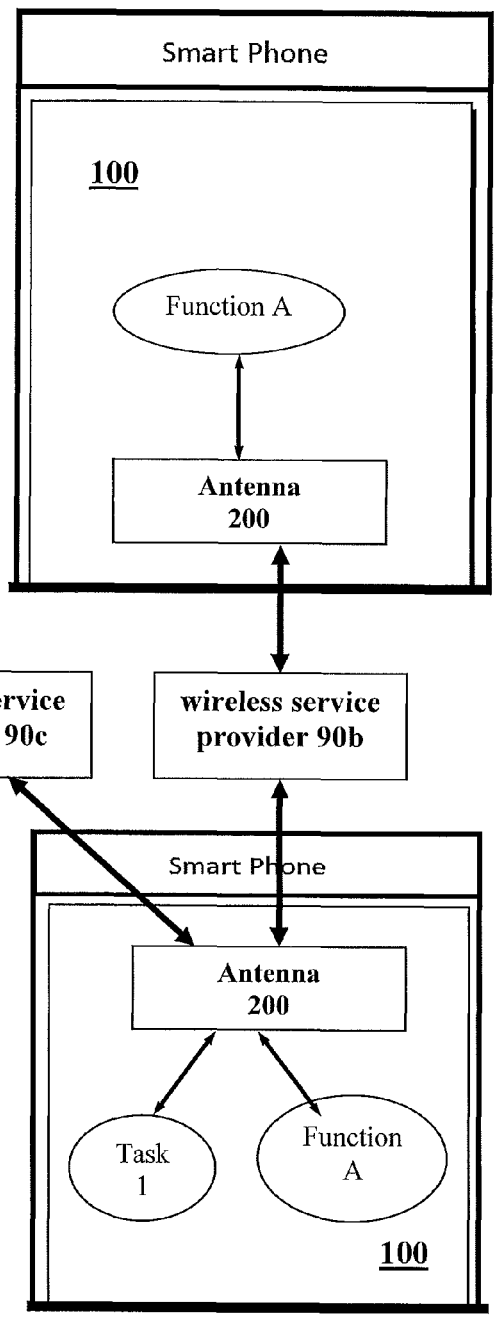

MOBILE DEVICE MORPHING USING MOBILE NETWORK AVAILABILITY

TECHNICAL FIELD

The present invention relates to mobile devices, and more specifically, to methods, apparatus and systems for allowing mobile devices to switch between different mobile network connections based on available service provider features and coverage for optimal mobile device performance.

BACKGROUND

Numerous different types of mobile electronic devices currently exist for both computing and/or telecommunications. Many of these mobile devices are capable of performing diverse sets of functions (i.e., tasks), providing a wide range of behaviors to perform various tasks, as well as interacting wirelessly over a cellular network, WiFi, an enterprise network, or other medium. For instance, smart cellular phones (i.e., "smart phones") have functionalities and applications, such as, global positioning systems (GPS), cameras, Internet access, computing processors, input/output units, and various other computing and communication components.

In performing and providing these different functions and behaviors, mobile devices often implement the use of one or more service providers that enable intercommunications between the various mobile devices. Typical service providers may include telecommunications service providers, network service providers, Internet service providers, transactional service providers (e.g., E-Bay, Amazon, etc.), and the like. Service providers may communicate through wired connections, wireless connections, or even both, to enable the intercommunication and connectivity between the various mobile devices.

Mobile devices are typically connected to wireless service providers. Once connected to a particular wireless service provider, a user of the mobile device may request a task or operation to be performed using such wireless service provider. These tasks and/or operations may include set user preferences or conditions for performing or completing such tasks/operations. For instance, user preferences may include, but are not limited to, predetermined or set financial parameters that the user is willing to expend (e.g., pricing plans and limits), performance requirements for completing such tasks on the mobile device, timing requirements, and the like. With all these preferences and/or conditions, often times the requested tasks and/or operations cannot be fully completed by the wireless service provider, which leads to end user (e.g., customer) frustration.

Often times wireless service providers cannot complete requested tasks/operations due to the service provider not having the required processing or service level features or capacities. It may also be due to low signal availability (e.g., weak RF signal strength), lost or dropped connections between the mobile device and the wireless service provider, or even poor service availability that prevent the mobile device from reaching its full potential (e.g., slow data transfer rates to and from the wireless service provider). Other reasons requested tasks/operations may not be completed on the mobile device are low wireless service provider coverage that causes unpredictable device performance (i.e., coverage does not extend to all geographic areas), as well as high costs of unnecessary device features that are detrimental to the user's experience.

To combat wireless service provider weak signal strength, or the slow data transfer rates, these service providers have enabled users to locally install a small, low-power cellular base station that connects to their wireless cellular networks. However, locally installed base stations are limited to users on the same network and only resolve signal issues in a small geographic area. Another resolution to weak wireless signal strength, or slow data transfer rates, is channel bonding. However, since channel bonding relates to static hardware and network configurations, it is not suitable for use with mobile devices.

As such, a need continues to exist for allowing mobile devices to easily, efficiently, and cost effectively switch between different wireless service providers based on available features and coverage for optimal mobile device use and performance.

SUMMARY

According to one or more embodiments of the present invention, the invention is directed to systems and apparatus for maintaining connection to a wireless service provider on a mobile device. The system includes a mobile computing device connected to a first wireless service provider, and a plurality of other wireless service providers accessible by the mobile computing device. The mobile computing device includes stored data and a morph engine. Triggering data (or a triggering event) is received at the mobile computing device, which initiates determination of an optimal wireless service provider that maintains a wireless signal connection on the mobile device. In doing so, the morph engine receives and compares the triggering data against the stored data to determine the optimal wireless service provider. The optimal wireless service provider is identified from the plurality of other wireless service providers, and the wireless signal connection on the mobile device is switched from the first wireless service provider to the optimal wireless service provider to maintain the wireless signal connection.

In one or more other embodiments the invention is directed to methods for maintaining connection to a wireless service provider on a mobile device. A mobile computing device is provided having stored data and a morph engine. A plurality of wireless service providers are provided that are each accessible by the mobile computing device. The mobile device is connected to a first of such plurality of wireless service providers. Triggering data (or a triggering event) is received at the mobile computing device, and transmitted to the morph engine thereof. The morph engine compares the triggering data against the stored data to determine an optimal wireless service provider that maintains a wireless signal connection on the mobile device. This optimal wireless service provider is identified from the plurality of wireless service providers, and if it is determined to be different from the service provider the device is already connected to, the wireless signal connection is switched to this optimal wireless service provider to maintain a wireless connection on the mobile device.

BRIEF DESCRIPTION OF THE DRAWINGS

FIGS. 5A, 5B, 5C and 5D illustrate still other embodiments and methods of the invention for morphing a mobile device based on external triggers.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
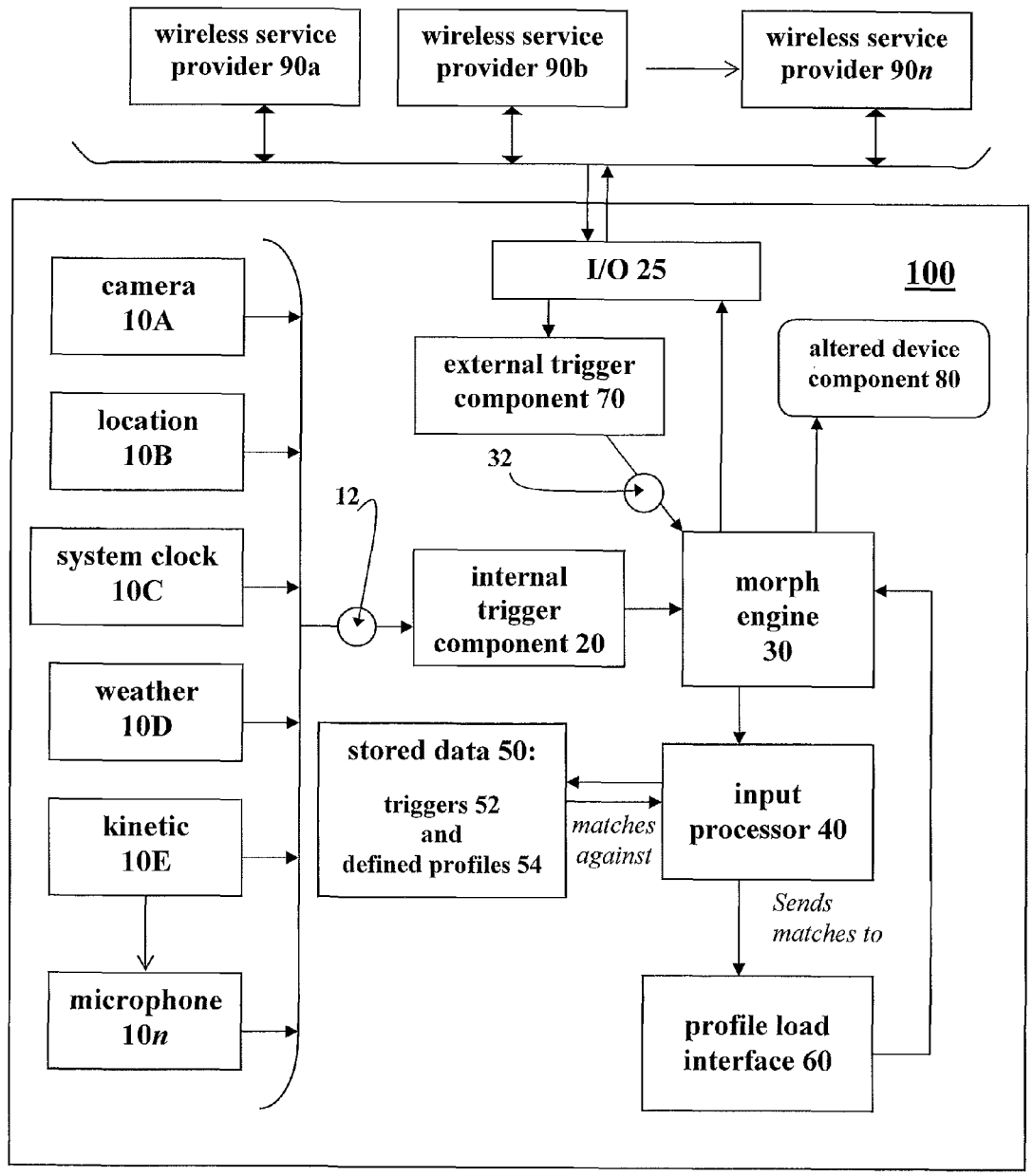
FIG. 1 illustrates components and systems for morphing a mobile device in accordance with one or more embodiments of the invention.
Figure 2A:
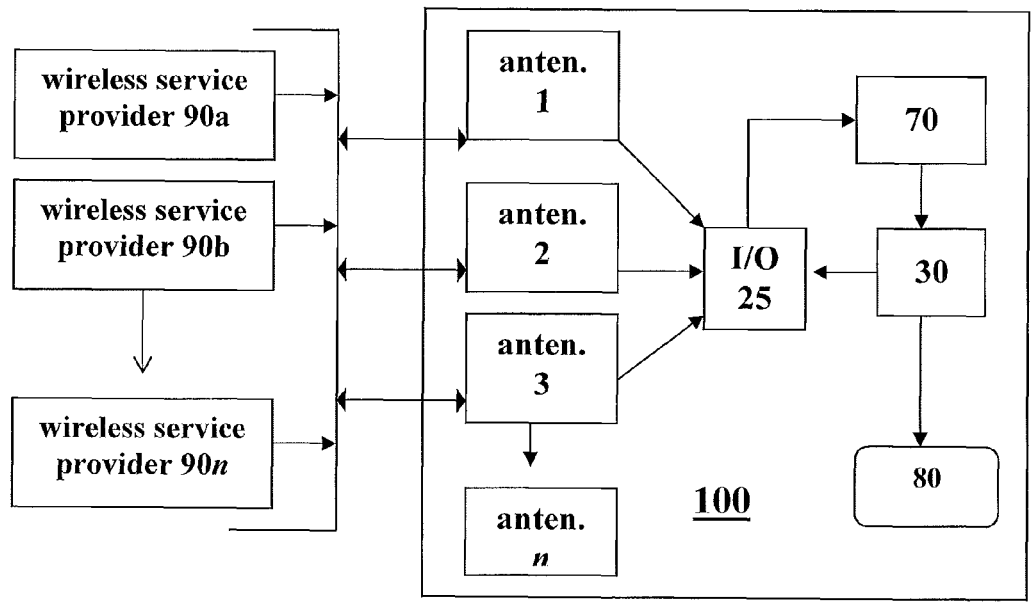
FIGS. 2A and 2B illustrate alternate embodiments of the invention shown in FIG. 1 for morphing a mobile device based on internal and external triggers.
Figure 2B:
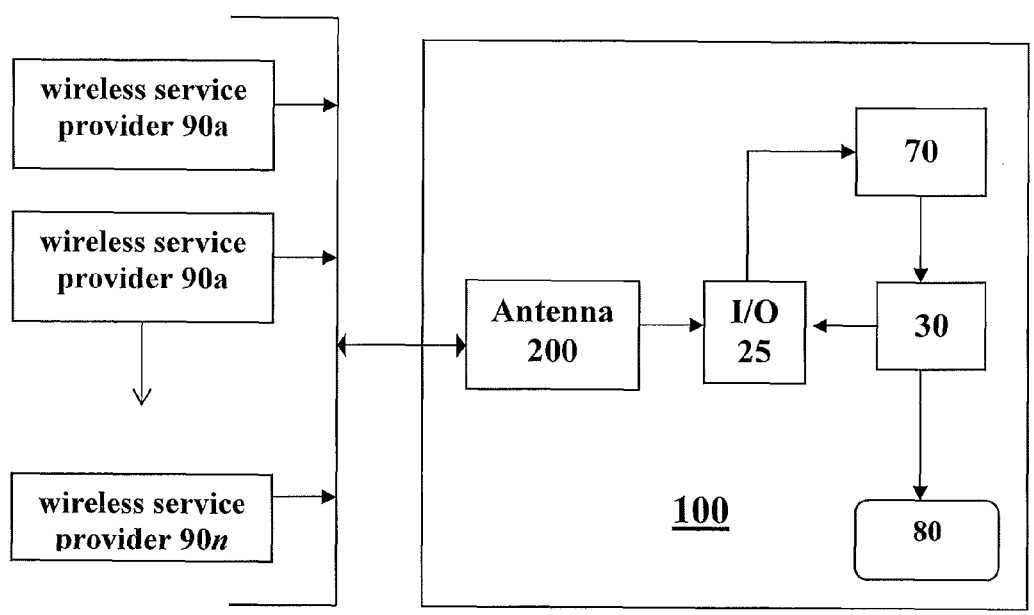

Reference is made herein to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative. Likewise, reference to "the invention" shall not be construed as a generalization of any inventive subject matter disclosed herein.

Current electronic mobile devices, such as cellular phones (e.g., a smartphone), are capable of performing a diverse set of functions, and providing a wide range of functionality. However, often times mobile devices are not able to adapt to wireless service provider levels and availability to match a user's financial and/or performance requirements and limits. This is particularly true when a wireless service provider has different service levels or features available that are offered at different pricing plans and limits. By not being able to adapt to a new wireless service provider, poor or weak wireless provider service availability on the mobile phone (e.g., slow data transfer rates to and from the service provider) prevent the mobile device from reaching its full potential. Further, low (weak) RF signal coverage of the wireless service provider in various geographical locations may also cause unpredictable performance and/or dropped connections between the mobile device and such wireless service provider.

In accordance with the various embodiments, the invention overcomes the above problems by allowing the mobile device to adapt itself to one or more new wireless service providers to provide the best user experience in terms of available features and service coverage from nearby wireless service providers. When it is determined that a particular wireless service provider operating on the mobile device cannot complete a request, task or operation, a morph engine within the mobile device switches the connection to one or more other nearby wireless service providers (i.e., a 'new' service provider(s)) with which such mobile device is adapted to make connection with. By switching to the new wireless service provider(s), the end user is provided with maximum service availability and/or minimum cost, while also providing service provider functionality that fits the user's needs or requirements.

In one or more embodiments, the invention includes a morph engine interface that receives external trigger data incoming into the mobile device from one or more wireless service providers that the device is either connected to, in communication with, or is adapted and able to be connected to. This incoming wireless service provider trigger data is compared to either a detected wireless service provider signal data or stored detected service provider signal data within the morph engine. Based on the analyzed incoming wireless service provider trigger data and service provider signal data, the morph engine configures the mobile device by dynamically adapting such mobile device's software based on user preferences. In adapting the mobile device's software, the morph engine switches the mobile device to connect with one or more wireless service provider(s) that will be able to communicate with and complete any requested tasks or functions on the mobile device.

In doing so, the invention allows the mobile device to provide customizable performance for all applications relying on voice, data, Internet, or other service availability. It also provides end users with the ability to dynamically adjust cost levels of the wireless service providers to fit either their usage patterns or fall within a spending budget.

While the invention is described in more detail below in reference to FIGS. 1-6B. It should be understood that various embodiments of the invention may include and/or implement usage of embedded systems, embedded electronic circuitry (e.g., a printed circuit board having electronic circuitry), electronic hardware, computer hardware, computer software and/or applications, system and network management software and hardware (devices), resource management, and the like.

It should be appreciated by one skilled in the art that in describing the various embodiments of the present invention herein, terminology may be used for describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, and/or components, but do not preclude the presence or addition of one or more other features, integers, steps, operations, elements, components, and/or groups thereof.

As will also be appreciated by one skilled in the art, embodiments of the invention may be embodied as systems, methods or computer program products. Accordingly, aspects of the invention may take the form of an entirely hardware embodiment, an entirely software embodiment (including firmware, resident software, micro-code, etc.) or an embodiment combining software and hardware that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. The computer readable storage medium (or media), may be a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The computer readable storage media being non-transitory including devices that retain recorded information only while powered (volatile devices) and devices that retain recorded information independently of being powered (non-volatile devices).

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), an electrical connection having one or more wires, an optical fiber, an optical storage device, a magnetic storage device, or any suitable combination of the foregoing. Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

In the context of this application, a computer readable storage medium may be any tangible medium that can contain, store, communicate, propagate, or transport a program for use by or in connection with an instruction operating system, apparatus, or device. Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and stored in a computer memory.

An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A computer readable signal medium may include a propagated data signal with computer readable program code embodied therein, for example, in baseband or as part of a carrier wave. This propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction operating system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computing device (e.g., desktop computer, laptop computer, mobile computing device, etc.), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computing device or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computing device or other programmable data processing apparatus to cause a series of operational steps to be performed on the computing device or other programmable apparatus to produce a computer implemented process. The instructions that execute on the computing device or other programmable apparatus provide processes for implementing the functions/acts specified in the flowchart and/or block diagram block or blocks.

It will further be appreciated by one skilled in the art, embodiments of the present invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

In cloud computing a user may access any of the resources that reside in the cloud at any time, and from anywhere across the Internet. In context of the present invention, a user may access applications or related data available in the cloud that allow video and/or audio to be transferred from one window/tab to another window/tab, or from one device to another. For example, the hardware, software, networking, connectivity, services, etc. of the cloud computing environment provide a user with the online service(s) of continuously viewing a video regardless of the window/tab the user is viewing by transferring the video(s) from its original window/tab (e.g., from its original URL) to the window/tab that the user is currently viewing. Cloud computing identifies and locates the video to its exact source code within the source code of the window/tab on which the video resides, copies the source code of the video and uploads it to a window/tab that is currently being viewed by the user so that the user is provided with the service of viewing the video(s) in a non-occluded manner. When hosted in a cloud environment, browsers are modified to accept applications in the cloud environment for offering and implementing the services of the various embodiments of the invention.

While the foregoing generally describes the present invention and aspects thereof, reference is now made to the drawings for a more detailed description of the various embodiments of the invention.

Referring now to the drawings, FIG. 1 shows one or more embodiments of the present invention for providing a morph engine interface 30 on a mobile device 100. The morph engine 30 configures the mobile device 100 by reacting to detected incoming wireless network service provider 90a-n information, and adapts the mobile device's 100 software based on end user's preferences to ensure that such mobile device maintains intercommunication with and connection to one or more wireless service providers 90a-n. While the present invention is described in connection with continuously maintaining a wireless network connection for a mobile device, it should be appreciated and understood that the embodiments of the invention may also be applied to continuously maintaining a wired network connection for mobile and/or stationary electronic devices.

Mobile devices 100 suitable for use in the present invention include those that communicate with wired and/or wireless network service provider(s), and are used in a variety of different context (e.g., individual use, travel, work, etc.). For instance, the mobile device may include, but is not limited to, a cell phone, a smartphone, IOS, android, PDAs, computing devices, laptop, a notebook, notebook, netbook, tablet, cameras, music/media players, GPS devices, networked appliances, any other networked device, and various types of intermediate networking devices. Generally, each mobile device is equipped with hardware and software that provide the device with a variety of resources and capabilities including wired and/or wireless networking capabilities, multimedia capabilities (e.g., viewing video, pictorial content, text, documents, etc.), file sharing resources, and the like.

As shown in FIG. 1 the mobile device 100 includes input and output units 25 (I/O 25), morph engine 30, an input processor 40, stored data 50 of one or more known triggers 52 and/or predefined user profiles 54, a profile load interface 60, a number of different applications 10A-10n that send internal trigger data events to the morph engine 30 via an internal trigger input component 20, and an external trigger component 70. The mobile device 100 is also adapted to be connected to a number of different external network service providers. In one or more embodiments, the mobile device 100 may be connected to one or more external wireless service providers 90a-90n that provide wireless network intercommunications. These wireless service providers 90a-90n transmit external signal data or triggering data events 32 that is input into the mobile device via I/O 25 through the external trigger component 70.

As used herein, the term "trigger" refers to an event (i.e., "triggering event" or triggering data) that a component of the mobile device 100 detects occurring and/or incoming, which may be connected to a predefined profile stored within the mobile device. A trigger event (or triggering data event, or triggering data) may be associated with a particular location where the mobile device resides, a time of day, detection of physical movement of the mobile device, an action or activity performed on the mobile device, combinations thereof, and the like. Upon detection of one or more triggering events, a component within the mobile device initiates a change to alter one or more features of the mobile device to ensure optimal performance and use of the mobile device. These changes may include, but are not limited to, a change in individual data (e.g., contacts, etc.), change applications, change in operating system, reconfigure stack, alter feature settings, load a backup system, prevent access to select data, alter appearance of meta-materials on the phone, automatically switch wireless service providers to ensure network connectivity, combinations thereof, and the like.

In detecting these triggering events and altering a feature of the mobile device based on such detected triggering events, the mobile device end user is able to individually or automatically customize mobile device settings (e.g., alter the look and feel of the device). These changing mobile device settings may be based on user preferences, desired end user scenarios, and/or geographic location of the mobile device. For instance, an end user may have different profile settings (e.g., contacts, screen settings, etc.) for work as compared to when home, such that, when a component of the mobile device detects that the user is at work (e.g., detects by time, geographic location (GPS), etc.) a work profile setting may be set in and on the mobile device. In the work setting the mobile device may be equipped with work contacts, work screen shot profile settings, work emails, increased security settings, and the like. Conversely, when it is detected that the end user has left work, components within the mobile device change the work setting to an individual setting so that the end user now has all of his individual settings (e.g., contacts, emails, games, pictures, etc.) visible and accessible on the mobile device.

Still further, the end user may be running a wireless networked application on the mobile device and come to a geographic location where signal(s) from the device's primary wireless service provider are weak, such that, performance of the application is slowed or stopped all together. In accordance with the invention, upon detection of this external triggering event of a low or weak wireless service provider signal, components within the mobile device automatically switch the primary wireless service provider to another wireless service provider detected as having a strong wireless signal so that the application may continue to used by the end user. It should be appreciated that these changes may be done automatically upon detection of triggering events, or the changes may be made by the end user based upon desired profile settings, mobile device needs, requirements, and the like.

Referring to the triggering events, in accordance with the invention these events may include internal triggering events 12, external triggering events 32, and combinations thereof. Referring to FIG. 1, internal triggering events 12 may be generated in the mobile device 100 by various applications 10A-10n, and received as input internal triggers 12 at the morph engine 30 through the internal trigger component 20. It should be appreciated that a number of different internal applications 10A-10n may be running on the mobile device 100. These applications 10A-10n may include both hardware and software for running their corresponding programs (e.g., set of instructions), as well as to detect program triggering events that result in the application performing an operation. Applications 10A-10n may include, but are not limited to, a camera 10A, location 10B (e.g., detection by GPS, cell tower identification, bounding area (radial feet) around GPS coordinates, etc.), system clock 10C (i.e., time of day), weather 10D, kinetics 10E (e.g., general and/or specific motion/movement), microphone 10n, as well as various other applications (e.g., RFID detection that detects nearness of a tagged item, identification of a tagged item, etc.).

With the variety of applications 10A-10n available, the internal triggering events 12 may be any one of a number of different operations or tasks carried out on one or more of such applications 10A-10n. For instance, when a camera 10A on the mobile device takes a picture, the input internal triggering event 12 may be image recognition or identification of an object in the image (e.g., detection and recognition of a clothing item, accessory, environment, etc.) In response thereto components of the invention may alter the settings, display, etc. of the mobile device (e.g., change the background screen to a tropical picture setting) as will be discussed further below. As another example a location 10B application, such as, a global positioning system (GPS) application may provide the input internal trigger 12 as a position of the mobile device. In this example, components of the invention may switch settings, applications, software, and/or appearances, etc. of the mobile device to a profile and settings associated with such particular location as detected by the GPS.

Other exemplary applications may include, but are not limited to, clock (timing), weather applications, and/or kinetic applications. A system clock application 10C may provide current time or a duration as the input internal triggering event 12. A weather application 10C may provide temperature (external temperature or device internal temperature) or other weather-related information as the input internal trigger 12. A kinetic application 10D may be associated with an accelerometer, for example, and may provide information about movement of the mobile device 100 as the input internal trigger 12. It should be appreciated and understood that depending upon the application being implemented in the mobile device, many other various input internal trigger 12 may be input into the morph engine 30 through the internal trigger component 20 for ultimately altering the mobile device itself based on such triggers and/or predefined profiles, as discussed further below.

In accordance with the invention the mobile device 100 is also connected to a number of different service providers 90a-90n that provide network communications to and from the mobile device. In one or more embodiments the external triggering events 32 include incoming wireless service provider 90a-90n data communications input into the mobile device 100 via I/O 25. The I/O 25 of the mobile device 100 transmits these input external trigger events 32 to an external trigger component 70, which in turn, transmits the external trigger events 32 to the morph engine 30 for processing in accordance with the invention. The external trigger events 32 may include any type of communication from the wireless service provider(s), or a lack of a communication from such wireless service provider(s), that the morph engine 30 identifies as being a triggering event that requires a need for change or alteration of one or more features of the mobile device.

Referring to FIG. 1, the mobile device 100 may be connected to one or more of these wireless service provider(s) 90a-90n whereby data from the wireless service providers are transmitted to the mobile device 100 via I/O 25. Simultaneously, data from the mobile device 100 is transmitted to such wireless service providers via I/O 25. In this manner, the mobile device and wireless service provider(s) are connected to one another for receiving and transmitted network communication data. It should be appreciated that the term "connected" includes operationally connected, logically connected, in communication with, physically or wirelessly connected, engaged, coupled, contacts, linked, affixed, and attached.

As used herein, the term wireless service provider refers to any mobile service provider entity that offers transmission services to users of wireless devices (e.g., handheld smart phones, tablets, handheld computers, etc.) through radio frequency (RF) signals rather than through end-to-end wire communication. A wireless service provider is also commonly referred to as a mobile service provider, wireless carrier and/or mobile carrier. A wireless service provider may offer cellular telephone services, individual communication services, or both. Wireless service providers may further provide satellite television and/or Internet access services. It should also be appreciated that these wireless service providers support and enable operation of other types of service providers such as, for example, transactional service providers (e.g., Amazon, eBay, online retail websites, etc.).

In one or more embodiments of the invention, suitable wireless service providers include those known wireless service providers in the United States such as, for instance, Verizon, Sprint, AT&T, T-Mobile, etc. It should be appreciated that numerous other wireless service providers exist amongst various different countries (e.g., Orange, CN Mobile, etc.), whereby mobile devices of the invention are suitable for use and equipped with both software and hardware for enabling the switching amongst different wireless service providers on the mobile device for continuously ensuring and maintaining a wireless network connection on the mobile device. Each wireless service provider differs with respect to terms of wireless service plans, costs of service plans, data speeds (e.g., 3G vs. 4G), accessibility based on geographic region, reliability, the mobile devices that each supports, and the like. Further, the service provider(s) 90a-90n may operate through various network connections each having different service profiles and policies (e.g., WWAN, WLAN, WPAN, Ethernet, DSL network connections, infrastructure network (e.g., LAN), and the like).

Referring to FIGS. 2A-2B, 4A-4D and 5A-5D, in connecting with the different wireless service provider(s) 90a-90n, each of the instant mobile devices may include one or more mobile device antennas residing therein and/or on a surface of such mobile device. These antennas may include a plurality of mobile device antennas 1, 2, 3, . . . n, or alternatively, a single universal or multipurpose antenna 200. It should be appreciated that the mobile device antennas 1, 2, 3, . . . n may be positioned anywhere in or on the mobile device, with positioning placement often guided by regulatory guidelines. For instance, due to frequency transmissions it is often desirable, and regulated, that mobile device antennas not be located near or adjacent the end user's ear for health and safety.

As shown in FIGS. 2A and 4A-4D, certain embodiments of the invention may include a plurality of primary cellular mobile device antennas 1, 2, 3, . . . n residing in or on the mobile device. Each of the mobile device antennas 1, 2, 3, . . . n, also referred to as cellular antennas, enable connection to and communication with the one or more wireless service provider(s) 90a-90n. In one or more embodiments, mobile device antennas 1, 2, 3, . . . n suitable for use in the present mobile devices 100 may include primary cellular antennas that both transmit and receive data to and from the wireless service providers for continuously maintaining a wireless network connection between a service provider and the mobile device. Each of the primary cellular antennas 1, 2, 3, . . . n are designed and configured to work with and meet both wireless service provider requirements as well as any necessary regulatory requirements.

Alternatively, as shown in FIGS. 2B and 5A-5D, the mobile device antenna may be a single universal or multi-purpose antenna 200 residing within or on the mobile device, whereby such antenna 200 is adapted to and capable of connecting with various different wireless service providers for making a connection between the mobile device and these one or more wireless service providers. Antenna 200 is adapted to work at various frequencies and support all bandwidths. In order to maintain the connection between the mobile device and the one or more wireless service providers, antenna 200 is capable of switching to different ones of the wireless service providers to ensure and maintain a continuous connection between the device 100 and the wireless service provider(s). It should also be appreciated that the mobile devices 100 of the invention may further include a number of other types of antennas that receive incoming data including, but not limited to, diversity cellular antennas that only receive data, GPS antennas, WIFI antennas, NFC antennas, and the like.

In accordance with the invention, each of the one or more cellular antennas on the mobile device 100 transmits wireless connection requirement data as well as wireless connectivity user preference data to the one or more of the wireless service providers 90a-90n. These plurality of primary or unitary cellular antennas may be adapted to work at various frequencies, including both lowband (somewhere between 700 and 960 MHz), highband (somewhere between 1710 and 2700 MHz), or even overlapping bandwidths of low and high frequencies. Typically, the frequencies transmitted from the mobile device (e.g., to the one or more mobile device antennas) may be at the low end of the band, while frequencies received into the mobile device (e.g., transmitted from the one or more mobile device antennas and into the mobile device) may be at the high end of the bandwidth. The various antennas suitable for use in the invention are also configured according to manufacturer specifications and requirements, with signals being transmitted to and from the antennas and mobile device according thereto.

Referring to FIG. 1, the internal triggering events 12 and external triggering events 32 are detected, within the mobile device 100, respectively by the internal trigger component 20 and the external trigger component 70. The internal triggering events 12 are transmitted to the morph engine 30 via the internal trigger component 20, while the external triggering events 32 are transmitted into the morph engine 30 via the external trigger component 70. The morph engine 30 is in communication with an input processor 40 that analyzes these incoming internal triggers 12. Alternatively, the morph engine 30 may be or include a processor. The input processor 40 may be a component of the morph engine 30, or it may be a separate component within the mobile device.

In one or more embodiments, the morph engine 30 may include input/output interfaces, a processor, and one or more memory devices for analyzing and storing data. In those embodiments wherein the input processor 40 and profile load interface 50 reside within the morph engine 30, the stored data 50 (i.e., triggers 52 and defined profiles 54) are stored within the one or more memory devices on the morph engine. Further in these embodiments, the input processor 40 may be a separate processor on the morph engine having functionality exclusively used by the morph engine 30, or it may be a shared processor providing shared functions for other components on the morph engine.

The input processor 40 compares the input internal triggers 12 and/or the received external triggering events 32 against stored data 50 that includes one or more known triggers 52 and/or predefined user profiles 54. The stored data 50 of known triggers 52 and profiles 54 may be stored on the morph engine 30 and/or it may be stored on another component within the mobile device. The triggers 52 and defined profiles 54 may define enabled applications, security settings for information access by the mobile device 100, and redundancy settings of the mobile device, such as, frequency of document backup, and the like. They may be defined by the user of the mobile device 100, or they may be predefined settings (e.g., by the manufacturer or service provider associated with the mobile device). For instance, if a company provides mobile devices 100 to its workers, the company may define one or more triggers to activate a work-related profile that may not be changed by the workers.

In accordance with the invention, a profile 54 may be a collection of settings, either preset or end user defined, that are associated with one or more triggering events (as described herein). In accordance with the invention, when a particular triggering event occurs and is identified by the invention, the profile associated with such triggering event may be used by to alter features, settings, appearances, and/or wireless service provider(s) on the mobile device. Profiles may include isolated profiles, split profiles and/or hybrid profiles. An isolated profile may only be loaded by itself and allows no other active profiles while running. A split profile may be one or more profiles that are running or suspended in the background while other profiles are being implemented on the mobile device. A hybrid profile may be one or more profiles that selectively allow running in split mode with other user specified profiles being run simultaneously.

The known triggers 52 may be any identified event stored in the mobile device, which when is detected as presently occurring on or near the mobile device is triggered for implementation and use by the mobile device. For instance, known internal and/or external triggers 52 may include, but are not limited to, a predefined time of the day, a geographical location (e.g., detected by GPS), loss of a wireless service provider signal, detection of a weak or low wireless service provider signal, set user defined preferences, one or more user defined preferred attributes of an optimal or preferred wireless service provider (e.g., defined requirements desired for a wireless service provider, service quality of signal from a wireless service provider, desired pricing of a wireless service provider, etc.), and the like.

Once the input internal triggers 12 and/or received external triggering events 32 are received at the morph engine 30, processing and analyzing thereof is initiated. Again, internal triggers 12 may be input into the morph engine 30 from one or more applications 10A-10n running on the mobile device through the trigger input component 20. External triggers 32 may be input into the morph engine 30 by one or more of the mobile device antennas 1, 2, 3, . . . n (or single universal antenna 200) detecting and receiving a signal (e.g., RF signal) from one or more wireless service provider(s) 90a-90n, whereby such received signal data is input into the external trigger component 70 via I/O 25. It should be appreciated that the incoming RF signal may be directly transmitted into the external trigger component 70.

In analyzing these internal triggers 12 and/or external triggers 32, the input processor 40 compares triggers 12, 32 to the stored data 50 that includes one or more known triggers 52 and/or predefined user profiles 54 for determining any matches there-between. Any identified matches between the incoming internal triggers 12 and/or external triggers 32 and stored known triggers 52 and/or predefined user profiles 54 are sent to the profile load interface 60. It should be appreciated that one or more incoming internal triggers 12, from one or more applications 10A-10n, may be compared against the stored data 50. Alternatively, one or more incoming external triggers 32, from one or more wireless service provider(s) 90a-90n, may be compared against the stored data 50. Still further combinations of internal triggers 12 and external triggers 32 may be compared against the stored data 50.

The internal triggers 12 and/or external triggers 32 may occur and be input into the morph engine 30 periodically at regular or irregular intervals. These internal triggers 12 and/or external triggers 32 are processed and analyzed by the input processor 40 against stored data 50. It should be appreciated that the input processor 40 may reside within the morph engine, such that, the comparing of stored data 50 to the triggers 12, 32 may be done by and within the morph engine 30. Alternatively, the input processor 40 may be a separate component from the morph engine. Any identified matches of known triggers 52 and/or predefined user profiles 54 matched to the input internal and/or external triggers 12, 32 are transmitted from the input processor 40 to the profile load interface 60. The profile load interface 60 may also be component residing within the morph engine, or it may be separate from the morph engine.

The profile load interface 60 transmits any identified matches of internal/external triggers 12, 32 matched to the stored data 50 to the morph engine 30. The morph engine receives these matches of known triggers 52 and/or predefined user profiles 54 for altering or changing a component 80 of the mobile device. Through its processors, circuitry, hardware, software, and the like, the morph engine 30 implements one or more of these received matches for altering one or more components of the mobile device and render altered device component(s) 80. The morph engine 30 may automatically implement any matched triggers (e.g., external triggers) and/or profiles once received, or the morph engine 30 may wait until a command or instruction is provided to implement such changes. For instance, an end user may desire to determine which matched triggers and/or profiles are to be implemented by selected desired matches from a stored and displayed list or table of matched triggers and/or profiles. In accordance with the invention, once a request is received at the morph engine 30 to change one or more components 80 of the mobile device, the morph engine 30 facilitates the internal and/or external trigger based morphing of the mobile device 100.

The mobile device component 80 being altered or changed may be linked to one of the internal triggers 12, one of the external triggers 32, or two or more components 80 may be changed based on both internal and external triggers 12, 32. In one or more embodiments of the invention, the mobile device component 80 altered may be one or more of the applications 10A-10n based on the input internal triggering events 12. In these embodiments, the input internal triggering events 12 are compared against the stored data 50 to determine if any changes or alterations in the applications running on the mobile device are necessary. It may further be determined if incoming request change data already exists or is running in a particular application, and if so, no changes to such application may be necessary. When it is determined that data differs, and changes need to be made to one or more applications, the morph engine and/or processors of the invention make the appropriate changes and alterations to such application(s). These changes may be made automatically by the mobile device, or alternatively, an end user may be given to the option to select application changes.

In accordance with the invention, in implementing changes to one or more of the applications 10A-10n, a hardware or physical feature of the mobile device may be changed. Through software on the mobile device, the morph engine 30 may change a physical appearance of the mobile device 100. For instance, based on a particular incoming internal trigger 12 (e.g., a GPS identifying the mobile device is located in a specific geographic area), a matched profile may be identified and selected that activates an application to change the mobile device 100 outer appearance based on the surroundings (e.g., GPS identifies location as Hawaii and the mobile device appearance is changed to tropical imagery). In this exemplary change, the requested alteration from the profile load interface 60 may also include security setting changes that cause the morph engine to initiate physical locking of the device's case. Another physical change may be the result of a user's desired outward appearance preferences for the mobile device. The incoming internal trigger 12 may be from an application that changes the exterior "skin" of the mobile device 100 (e.g., change coloring, pattern, shade matching the user's clothing or objects in the vicinity of the mobile device, and the like.). These changes of the invention to components 80 may be performed periodically, continuously, or at an end user's discretion.

Figure 3A:
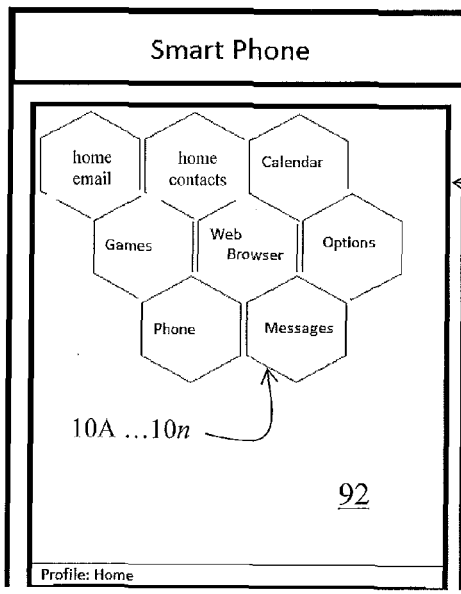
FIGS. 3A, 3B and 3C illustrate embodiments and methods of the invention for morphing a mobile device based on internal triggers.
Figure 3B:
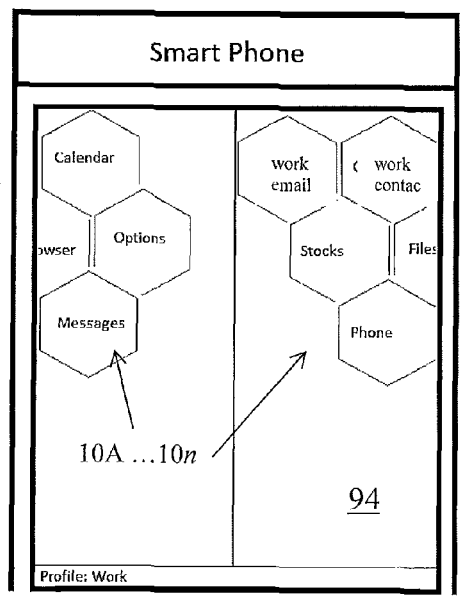
Figure 3C:
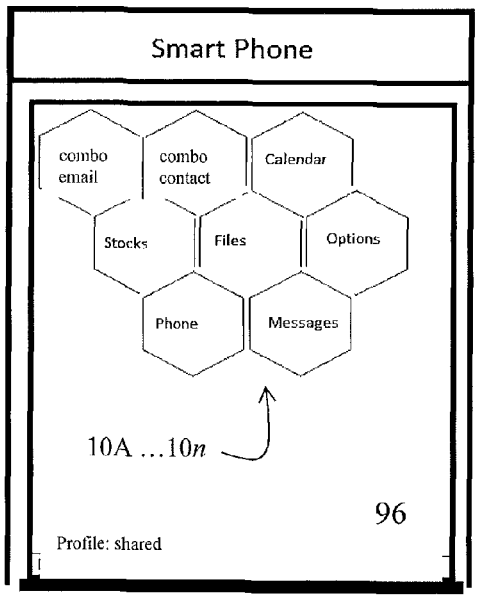

Referring to FIGS. 3A-3C, another exemplary embodiment of the invention depicts the mobile device 100 as a cellular smart phone, whereby the components 80 changed are various software applications 10A-10n running on the mobile phone. The internal triggers 12 may be triggered based on detection of physical locations of the phone, such as by GPS, or by end user inputs. These detected locations may include, but are not limited to, a home location, a work location, a recreational location, etc. The internal trigger 12 is input into the morph engine 30 and is processed by the input processor 40 which compares this input internal trigger data against the stored data 50 of known triggers 52 and/or defined profiles 54. Once a match is detected, any matches are transmitted to the morph engine 30 via the profile load interface 60 to implement any necessary changes to component 80.

For example, in FIG. 3A the mobile phone may be at the user's home location, whereby the home profile is detected and home profile 92 application settings are displayed on the display screen. The user may then proceed to his work environment, whereby GPS detects the geographic location and sends this GPS internal trigger data 12 to the morph engine for analyzing and processing. In accordance with the invention, this GPS location is identified and matched to a work profile 94, whereby the morph engine alters the phone features and settings to run and display the work profile 94 as shown in FIG. 3B. For example, a work profile 94 may be set to load when the mobile device 100 is within 500 ft of the user's workplace GPS coordinates.

By enabling the easy and convenient switching between profiles in accordance with the invention, the end user is able to customize his phone based on geographical locations and user preferences (e.g., the home profile 92 may include a home email application, while the work profiles 94, 96 may include a work email application). The user is also able to access data and operating systems based on such profiles. For instance, a work profile may be set to load a company approved operating systems and/or applications, while simultaneously suspending all other operating systems running on the mobile device.

The security settings may be different according to each of the home profile 92 and work profiles 94, 96 (e.g., work email may require a password while home email does not; work profiles 94 may be encrypted with a user specified password while home profiles 92 are not, etc.). Based on these security settings, when the end user leaves the work location files or applications associated with the work profile 94 may be automatically locked and protected from access. As such the end user may use one or more profiles (whether a home or work profile) without leaking any confidential information since the invention switches between operating systems based on the type of profile activated on the phone, and without having to utilize restricted operating systems/application with strict password security requirements.

In another setting, the end user may be located at a location (which may be home, work or another location) that allows the end user to display a split or shared hybrid profile 96 that includes both home profile settings and work profile settings. This hybrid shared profile 96 may be customized by the end user, or it may be automatically loaded by the invention upon detection and identification of a triggering event in accordance with the invention. The shared profile 96 may include a foreground profile of the home profile 92 and a background profile of the work profile 96 (or vice versa), which when altered is changed into the hybrid shared profile 96 shown in FIG. 3C. The hybrid screen may include hidden applications that may be retrieved by the end user as desired, and operate and run in concert with other applications present in the hybrid shared profile 96. In the shared profile 96 applications from the home profile and work profile may be operated simultaneously, each retrieving and sharing both data and/or functionality with each other as needed.

In these embodiments of the invention a user is provided with the ability to confidentially share business and/or individual use and needs to access confidential data as needed (e.g., as part of their work requirements may only access work files within work environment so that confidential data is protected outside of the work environment). The mobile devices 100 of the invention may be provided with a number of different types of profiles that may be automatically implemented, or individually implemented by the end user, based on detection of a triggering event and matching of such triggering event to trigger and/or profile data stored in the mobile device. As another example, a profile 54 may be configured and identified as an emergency phone profile that may be triggered by kinetic sensors (e.g., if phone receives a hard shake, a trigger of kinetic motion detecting signs of an accident, etc.) or switches activated by the end user. Upon implementation of this emergency phone profile in accordance with the invention, the end user may be provided with a speed-dial button for 911 as well as the phone transmitting GPS coordinates of the phone and end user to emergency services. Still another example is a recovery console profile that allows an end user to select this profile for mobile device operating system(s) maintenance tasks (e.g., re-installing software, stopping running processes, recovering lost or corrupt files, etc.

The mobile device component altered in accordance with the invention in FIGS. 4A-5C may be a change in one or more of the wireless service provider(s) 90a-90n. These changes may be initiated based upon detection and receipt of external triggering event 32 data/information. The external triggering data 32 that initiates such change(s) may include, but is not limited to, any type of communication or signals from one or more wireless service provider (.g., detection and receipt of wireless RF signals), strength of a signal from one or more service provider (e.g., a measure of RF signal strength), loss of signal from one or more service provider, geographic location of the mobile device, detection of a preferred service provider, network data availability, and the like.

Figure 4A:
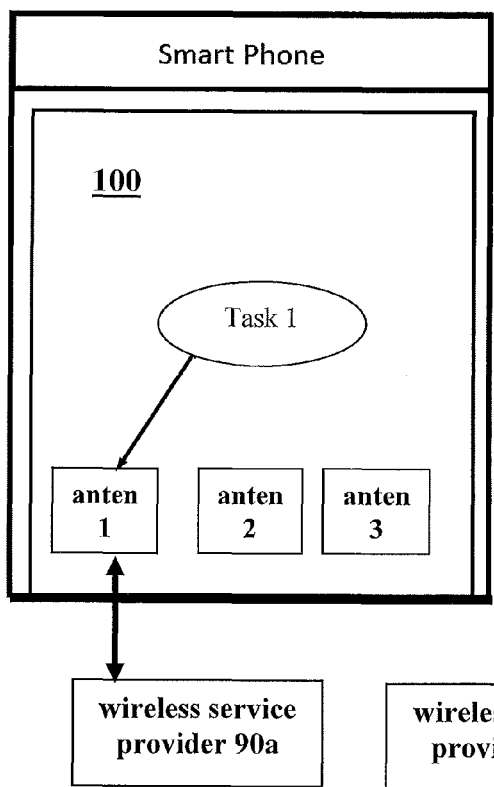
FIGS. 4A, 4B, 4C and 4D illustrate other embodiments and methods of the invention for morphing a mobile device based on external triggers.

As shown in FIG. 4A, a smart phone 100 may have one or more mobile device antennas 1, 2, 3, . . . n with a first antenna 1 receiving a signal from a first wireless service provider 90a. The end user, and phone 100, may move to a different location (e.g., travel to a different state) where the first antenna 1 receives no signal, or a weak signal, from the from wireless service provider 90a. This low signal, or lack thereof, is the triggering event 32 that is input into the external trigger component 70 of FIG. 1 via I/O 25. Referring to FIG. 1, the external trigger 32 is transferred from the external trigger component 70 to the morph engine 30 for analysis and processing thereof using stored data 50, input processor 40, and/or the profile load interface 60 components of the invention. Identified matches are sent to the profile load interface 60, which sends a command or request to the morph engine 30 for changing or altering the wireless service provider.

Referring to FIGS. 1 and 4A, in matching the incoming external triggers 32 with data on the mobile device, stored data 50 may include known triggers 52 and/or predefined user profiles 54 that are associated with one or more wireless service provider(s) 90a-90n (or single universal antenna 200). Exemplary external triggers 52 for wireless service providers include, but are not limited to, signal strength from a wireless service provider, absence of a signal from a wireless service provider, detection of a preferred service provider, wireless service provider availability (e.g., in certain geographic regions), wireless service provider costs, availability of streaming feeds from select wireless service providers, voice and data services from select wireless service providers, and the like. The known triggers 52 and predefined user profiles 54 may include, for instance, identification and data associated with preferred wireless service provider(s), select wireless service providers known to have strong signals within a certain geographic region, user preferred cost levels or payment structure plans for a wireless service provider based on usage, required signal strengths for device processing, and the like.

Figure 4B:
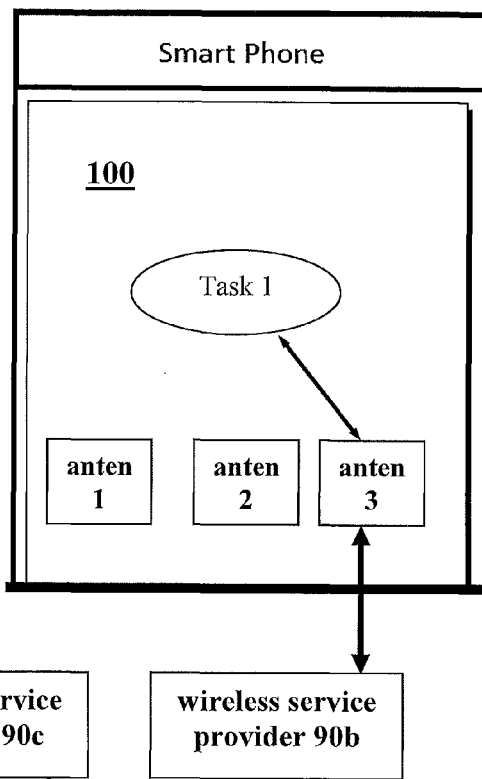

Once the morph engine 30 receives matches between the external triggers 32 and stored data as shown in FIG. 1, implementation of switching between wireless service providers is initiated. For instance, as shown in FIG. 4B the invention switches the mobile device 100 from the first wireless service provider 90a to a second wireless service provider 90b. The mobile device is connected to this second wireless service provider 90b through a second mobile device antenna 2. In doing so the end user with mobile device (i.e., mobile phone) may have moved to a different geographical location as compared to the location of FIG. 4A, such that, the external trigger 32 comprising new GPS coordinates is received and processed in accordance with the invention. It may be determined that at the location of FIG. 4B, the second wireless service provider 90b has a stronger RF signal as compared to the first wireless service provider 90a. Based on profiles 54, or end user discretion, the service provider carrier may be switched in the mobile device from first provider 90a to second provider 90b in order to continuously receive a strong wireless service provider signal for continued use on the phone.

Figure 4C:
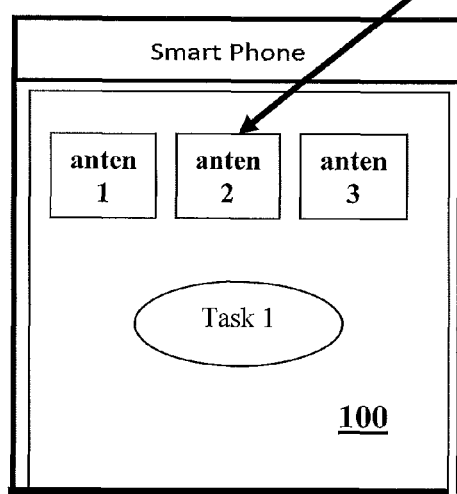

Still further, while in the location of FIG. 4B, the end user (or system) may identify a third wireless service provider 90c having better pricing and data rates accessible by and to the mobile device, or may have a better service package. As shown in FIG. 4C, either the end user or the present system may switch from the second wireless service provider 90b to this third wireless service provider 90c within the mobile device. The mobile device may be connected to the third wireless service provider 90c through a third mobile device antenna 3.

Figure 4D:
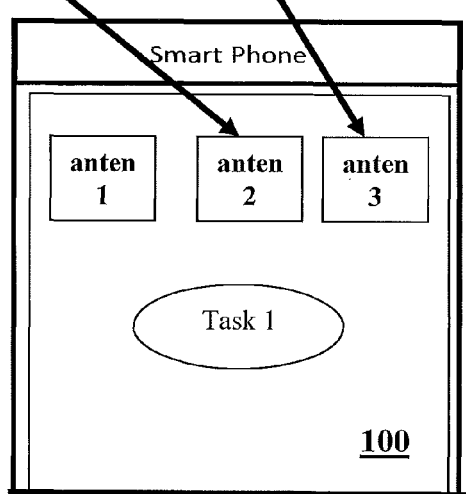

Even further, it should be appreciated that one or more incoming external triggers 32 from one or more wireless service providers 90b and 90c may be implemented and connected to simultaneously on the mobile device via one or more antennas as shown in FIG. 4D. In connecting to multiple wireless service providers, the invention allows sharing of resources amongst these multiple wireless service providers. It also ensures continuous service provider connectivity in the event signals from one of the wireless service providers are lost or dropped. With multiple wireless service providers being in communication with the mobile device, such mobile device is simultaneously provided with different service provider features that may only be available on one or the other of such service providers. As such, the present invention supports and enables activation of multiple different service providers on a single mobile device 100.

Referring to FIGS. 5A-5D, the mobile device 100 may include a single universal antenna 200 that is able to transmit and receive various types of signals from the different one or more wireless service provider(s) 90a-90n. This single antenna 200 may be connected to the first wireless service provider 90a for carrying out a first task (FIG. 5A). When the device moves to a different location, the signal from the first wireless service provider 90a is lost or weak, another service provider (e.g., wireless service provider 90b) is detected that has better service plans/data rates/pricing, or another triggering event occurs, the morph engine switches the antenna 200 to make connection with the other wireless service provider 90b (FIG. 5B). These connections may be further switched to another wireless service provider 90c (FIG. 5C) or even multiple wireless service providers 90b and 90c simultaneously (FIG. 5D).

In switching between different wireless service provider(s) 90a-90n, the present systems, methods and components compare incoming triggers 32 against the known triggers 52 and predefined profiles 54. These known triggers 52 and/or predefined profiles 54 may include preferences identifying specific or preferred pricing ranges an end user is willing to pay, service provider requirements, specific wireless service providers that are known to be accessible within a particular geographic region or location, and the like. Through the morph engine, components of the invention periodically compare the incoming external triggers 32 against the database of known triggers 52 and/or predefined profiles 54 to check for matches there-between. Parameters checked may include, but are not limited to, pricing, availability, signal strength, etc. of various services from nearby wireless service provider(s) 90a-90n networks.

When a match is found and identified, an inactive profile may be activated, while simultaneously an active one may be deactivated, so that the mobile device is switched to a different wireless service provider. In one or more embodiments, the morph engine 30 implements these steps of activating and deactivating the various profiles 54 and wireless service providers available on the mobile device. The morph engine may bind single or multiple triggering events to the mobile device software for automatically activating and/or deactivating mobile device features upon triggering event detection. These switches may be done automatically or manually when a command/instruction to change is provided through the morph engine. Through the various components of the invention, the mobile device may maintain either a single or multiple predefined profiles 54 running simultaneously across one or more cores. These profiles 54 may be instructed to run on restricted cores with no access to such cores by other profiles 54.

While not meant to be limiting, exemplary profiles 54 of the invention may include service provider costs data, service provider signal data (e.g., strength, presence thereof, absence thereof, etc.), service provider system requirements, and the like. For instance, a profile 54 may be configured to always select the wireless service provider with the lowest cost for unlimited data. The morph engine would re-configure the phone to send data over this network, and would do so automatically any time it detected a lower price on a particular network. As such the invention provides an end user with the ability to dynamically adapt service provider levels and availability, as well as cost levels, to match user financial preferences, usage patterns and/or performance needs. This provides the end user with an improved mobile device use experience and allows the user to automatically access and utilize the best possible wireless service provider service available at any given time.

As another example, a profile 54 may be configured to always use the network that has the strongest signal and/or available coverage. The morph engine monitors signal strength of nearby wireless service provider networks, and switches the phone to use the wireless service provider network that has the strongest available signal. The external triggering event 32 for such an embodiment may be the presence or absence of a strong signal received at the mobile device from one or more wireless service providers. The invention enables the mobile device to continuously receive and maintain a signal from a wireless service provider by switching between wireless service provider networks to provide the best user experience in terms of available features and service coverage from nearby service providers.

Further in switching between different wireless service provider(s) 90a-90n, the morph engine 30 may have access to the software of the mobile device for altering or changing operating systems, available applications, input/output channels for applications, SIM cards, as well as for switching between different wireless service provider(s) 90a-90n. The one or more mobile device antennas 1, 2, 3, . . . n in the mobile device 100 connect to a communications processor in the mobile device for implementing various cell phone standards (e.g., gma, gfm software). These mobile device antennas receive RF signals from the wireless service provider(s) 90a-90n, convert such signals to analog signals, and transferred these signals to the communications processor.

As such, embodiments of the invention provide an interface for configuring a mobile device to react to detected wireless service provider data/information, and either automatically or based on user preferences, adapt its software and/or hardware dynamically in response thereto. For instance, a mobile device may be customized (automatically or by an end user) based on voice, data, Internet, or other service availability, including dynamic allocation of voice and data services from different wireless service provider networks. The invention provides a combination of software and hardware to monitor the level and quality of services available from different wireless service providers (e.g., data roaming services), analyze and quantify this triggering data, and alter the software stack of the mobile device to match user preferences for wireless service provider quality and/or price, and the like. In altering the software, the morph engine of the mobile devices switches wireless service providers to provide the user with the best available wireless service available that ensures and maintains the wireless connections. The mobile device is able to react to detected service information and adapt its software dynamically in response based on user preferences, and adapt itself to provide the best user experience in terms of available features and service coverage from nearby service providers. The invention provides a mobile device with maximum service availability and/or minimum costs that fits the user's needs at any given moment.

Figure 6A:
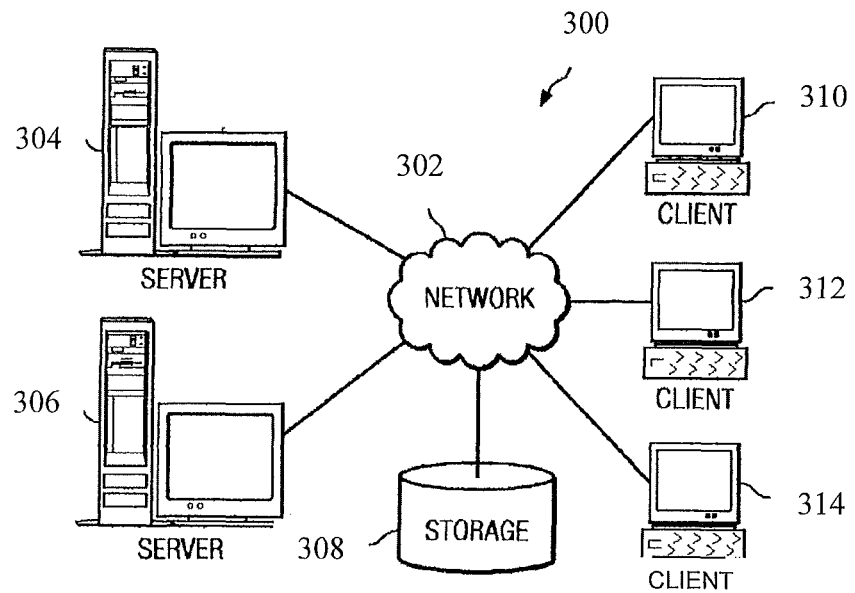
FIG. 6A illustrates a representation of a network of a data processing system in which embodiments of the invention may be implemented.
Figure 6B:
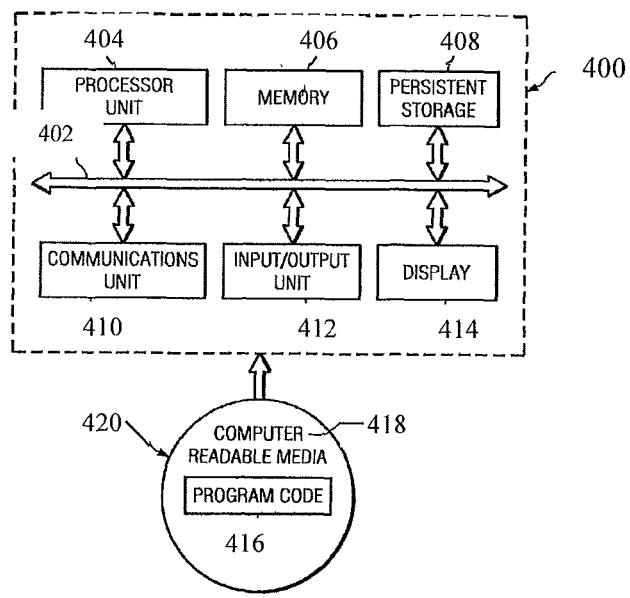
FIG. 6B illustrates a block diagram of a data processing system in which certain embodiments of the invention may be implemented.

Exemplary diagrams of data processing environments are shown in FIGS. 6A and 6B in which embodiments of the invention may be implemented. It should be appreciated and understood that these drawings are only exemplary and are not intended to assert or imply any limitation with regard to the environments in which different embodiments may be implemented. Many modifications to the depicted environments may be made.

A representation of a network of data processing systems in which embodiments of the invention may be implemented are shown in FIG. 6A. Network data processing system 300 may be a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server 304 and server 306 connect to network 302 along with storage unit 308. In addition, clients 310, 312, and 314 (e.g., PC or network computers) connect to network 302. The servers may provide data, such as boot files, operating system images, and applications to clients 310, 312, and 314. Network data processing system 300 may include additional servers, clients, and other devices not shown. The program code located in network data processing system 300 may be stored on a computer recordable storage medium and downloaded to a data processing system or other device for use. For example, program code may be stored on a computer recordable storage medium on server 304 and downloaded to client 310 over network 302 for use on client 310.

Network data processing system 300 may be the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 300 also may be implemented as a number of different types of networks, such as, for example, an intranet, a local area network (LAN), or a wide area network (WAN), or within a cloud computing environment. Again, these figures are meant to be examples and not as an architectural limitation for the different illustrative embodiments.

The block diagram of FIG. 6B illustrates a data processing system of certain embodiments of the invention. The data processing system 400 is an example of a computer, such as server 304 or client 310 in FIG. 6A, in which computer usable program code or instructions implementing the processes may be located. The data processing system 400 may include communications fabric 402, which provides communications between processor unit 404, memory 406, persistent storage 408, communications unit 410, input/output (I/O) unit 412, and display 414.

A central processing unit (CPU) 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410 provides for communications with other data processing systems or devices. In these examples, communications unit 410 may be a network interface card. Communications unit 410 may provide communications through the use of either or both physical and wireless communications links. Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for use by processor unit 404. The processes of the different embodiments may be performed by processor unit 404 using computer implemented instructions, which may be located in a memory, such as memory 406. These instructions are referred to as program code, computer usable program code, or computer readable program code that may be read and performed by a processor in processor unit 404. The program code in the different embodiments may be embodied on different physical or tangible computer readable media, such as memory 406 or persistent storage 408.

Program code 416 may be located in a functional form on computer readable media 418 that is selectively removable and may be loaded onto or transferred to data processing system 400 for use by processor unit 404. Program code 416 (i.e., instructions) and computer readable media 418 form computer program product 420 in these examples. The computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer recordable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

Again, these examples of the data processing system 400 are not meant to be limiting. Rather, the data processing system 400 may be implemented in various forms. For example, data processing system 400 may be a computer, a workstation, a laptop computer, a mobile phone, an end-user digital assistant, or some other suitable type of data processing system. The various embodiments of the invention may be implemented using any hardware device or system capable of executing program code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for maintaining connection to a wireless service provider on a mobile device comprising:
    a mobile computing device connected to a first wireless service provider;
    a plurality of other wireless service providers accessible by the mobile computing device;
    stored data on the mobile computing device;
    triggering data received at the mobile computing device that initiates determination of an optimal wireless service provider to maintain a wireless signal connection on the mobile device; and
    a morph engine of the mobile computing device that receives and compares the triggering data against the stored data to determine said optimal wireless service provider, identify said optimal wireless service provider from said plurality of other wireless service providers, and switch the wireless signal connection on the mobile device from the first wireless service provider to the optimal wireless service provider to maintain the wireless signal connection,
    wherein the stored data on the mobile computing device includes one or more internal triggering data that when received at the mobile computing device initiates a change to one or more features of the mobile device, wherein the internal triggering data results in a change to one or more features of the mobile device selected from the group consisting of change in individual data, change applications, change in operating system, reconfigure stack, alter feature settings, load a backup system, prevent access to select data, alter appearance of meta-materials on the phone, and automatically backup switching of wireless service providers to ensure network connectivity.

2. The system of claim 1 wherein the stored data on the mobile computing device includes profiles and known triggers, the morph engine compares the triggering data against the known triggers, the profiles, or both the known triggers and the profiles.

3. The system of claim 2 wherein the profiles comprise user profiles defined by an end user.

4. The system of claim 2 wherein the profiles comprise preset profiles defined by a manufacturer.

5. The system of claim 2 wherein the profiles comprise a collection of settings including data identifying each of said plurality of other wireless service providers along with their corresponding attributes.

6. The system of claim 2 wherein the known triggers include external triggering data input into the mobile computing device that initiate a change in wireless service providers.

7. The system of claim 6 wherein the external triggering data are selected from the group consisting of geographic location detection, time, receipt of wireless signal, strength of received wireless signal, loss of wireless signal, absence wireless service provider signal, detection of a preferred service provider, wireless service provider availability, detection of wireless service provider costs, availability of streaming feeds from select wireless service providers, kinetic motion, and an activity performed on the mobile device.

8. The system of claim 2 wherein the known triggers comprise one or more user defined preferred attributes desired from the optimal wireless service provider that will maintain the wireless signal connection at the mobile computing device.

9. The system of claim 1 further including one or more antennas on the mobile computing device, the triggering data is received as a signal by one or more antennas and transmitted to the morph engine.

10. The system of claim 1 wherein the morph engine is a hardware component within the computing device having device hardware and software for implementing steps carried out by said morph engine.

11. The system of claim 1 wherein the mobile computing device is selected from the group consisting of a cell phone, a smartphone, IOS, android, PDAs, computing devices, laptop, a notebook, notebook, netbook, tablet, cameras, music/media players, GPS devices, networked appliances, and a networked device.

12. A method for maintaining connection to a wireless service provider on a mobile device comprising:
providing a mobile computing device having stored data and a morph engine;
providing a plurality of wireless service providers accessible by the mobile computing device;
connecting the mobile device to a first wireless service provider of the plurality of wireless service providers;
receiving triggering data at the mobile computing device;
transmitting the triggering data to the morph engine, the morph engine comparing said triggering data against the stored data to determine an optimal wireless service provider that maintains a wireless signal connection on the mobile device;
identifying said optimal wireless service provider from said plurality of wireless service providers;
switching said wireless signal connection to said optimal wireless service provider if it is determined to be different from said first wireless service provider; and
receiving one or more internal triggering data at the mobile computing device, said one or more internal triggering data initiating a change to one or more features of the mobile device, wherein the internal triggering data results in a change to one or more features of the mobile device selected from the group consisting of change in individual data, change applications, change in operating system, reconfigure stack, alter feature settings, load a backup system, prevent access to select data, alter appearance of meta-materials on the phone, and automatically backup switching of wireless service providers to ensure network connectivity.

13. The method of claim 12 wherein the stored data on the mobile computing device includes profiles and known triggers, said morph engine comparing the triggering data against the known triggers, the profiles, or both the known triggers and the profiles.

14. The method of claim 13 wherein the known triggers comprise one or more user defined preferred attributes desired from the optimal wireless service provider that will maintain the wireless signal connection at the mobile computing device.

15. The method of claim 13 wherein the known triggers include external triggering data input into the mobile computing device that initiate a change in wireless service providers.

16. The method of claim 15 wherein the external triggering data are selected from the group consisting of geographic location detection, time, receipt of wireless signal, strength of received wireless signal, loss of wireless signal, absence wireless service provider signal, detection of a preferred service provider, wireless service provider availability, detection of wireless service provider costs, availability of streaming feeds from select wireless service providers, kinetic motion, and an activity performed on the mobile device.

17. The method of claim 12 further including receiving and monitoring new triggering data for determining if another of said plurality of wireless service providers is said optimal wireless service provider for continuously maintaining said wireless signal connection on the mobile device.

\* \* \* \* \*